United States Patent
Goldstein et al.

(10) Patent No.: US 10,887,465 B2
(45) Date of Patent: Jan. 5, 2021

(54) NETWORK SERVICE FOR DYNAMIC SELECTION OF VOICE COMMUNICATION MEDIUM FOR CALL CONNECTIONS

(71) Applicant: Uber Technologies, Inc., San Francisco, CA (US)

(72) Inventors: Lawrence Benjamin Goldstein, San Francisco, CA (US); Arjun Vora, San Francisco, CA (US); Xiaochao Yang, San Mateo, CA (US); Jeremy Wyatt Lermitte, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 185 days.

(21) Appl. No.: 15/980,259

(22) Filed: May 15, 2018

(65) Prior Publication Data

US 2019/0356783 A1 Nov. 21, 2019

(51) Int. Cl.
*H04W 4/021* (2018.01)
*H04M 3/56* (2006.01)

(52) U.S. Cl.
CPC ............ *H04M 3/56* (2013.01); *H04W 4/021* (2013.01); *H04M 2242/30* (2013.01)

(58) Field of Classification Search
CPC .. H04M 3/56; H04M 2242/30; H04M 7/0057; H04W 4/021; H04L 65/1069; H04L 65/80
See application file for complete search history.

(56) References Cited

U.S. PATENT DOCUMENTS

| | | | |
|---|---|---|---|
| 2004/0192336 A1 | 9/2004 | Walby | |
| 2005/0141694 A1* | 6/2005 | Wengrovitz | H04M 3/5191 379/265.09 |
| 2007/0049245 A1* | 3/2007 | Lipman | H04L 12/14 455/406 |
| 2007/0060097 A1* | 3/2007 | Edge | H04L 65/1006 455/404.1 |
| 2008/0222294 A1* | 9/2008 | Liang | H04W 36/24 709/227 |
| 2008/0227491 A1 | 9/2008 | Oonuma | |
| 2009/0221265 A1* | 9/2009 | Liu | H04W 12/06 455/411 |
| 2010/0081428 A1* | 4/2010 | Maejima | H04W 36/0055 455/426.1 |
| 2011/0230162 A1* | 9/2011 | Mutikainen | H04W 76/50 455/404.1 |

(Continued)

FOREIGN PATENT DOCUMENTS

CN 104468378 3/2015

OTHER PUBLICATIONS

ISR and Written Opinion in PCT/US2019/032495 dated Aug. 13, 2019.

*Primary Examiner* — Anez C Ebrahim
(74) *Attorney, Agent, or Firm* — Mahamedi IP Law LLP

(57) ABSTRACT

A network computer system can respond to a call connection signal by making a determination as to whether the call connection is likely to be supported for at least one of the caller or receiver using a first voice communication medium, as compared to an alternative voice communication medium. Based on the determination, the network computer system can cause the call connection to be established using the voice communication medium of the determination.

20 Claims, 5 Drawing Sheets

(56) References Cited

U.S. PATENT DOCUMENTS

| | | |
|---|---|---|
| 2014/0274009 A1 | 9/2014 | Do |
| 2015/0149591 A1 | 5/2015 | Gibbon |
| 2015/0201363 A1 | 7/2015 | Lundqvist |
| 2016/0112941 A1 | 4/2016 | Desai |

* cited by examiner

US 10,887,465 B2

NETWORK SERVICE FOR DYNAMIC SELECTION OF VOICE COMMUNICATION MEDIUM FOR CALL CONNECTIONS

TECHNICAL FIELD

Examples as described herein pertain to network services for dynamic selection of voice communication mediums for call connections.

BACKGROUND

As mobile devices continue to advance, the services and functionality offered to such devices also increase in number and sophistication. For example, the cellular networks that support such devices also enable users to use various telephony and messaging services. Such services further enable numerous types of functionality which are enabled through the advancement of the mobile devices and the underlying networks which such devices use. For example, telephony services increasingly include camera-based services which transfer video, rather than just audio.

Numerous services exist which utilize mobile devices operated by users. Examples of such services include on-demand transport services, such as services which arrange transport or deliveries for users. Such service arrangements often require coordination between its users, which may include service providers and requesters. For example, an on-demand transport service often requires a requester and service provider to meet at a common location at the same time. Likewise, an on-demand delivery service may require a service provider to coordinate an order pickup with a business.

BRIEF DESCRIPTION OF THE DRAWINGS

The disclosure herein is illustrated by way of example, and not by way of limitation, in the figures of the accompanying drawings in which like reference numerals refer to similar elements, and in which.

Figure 1:
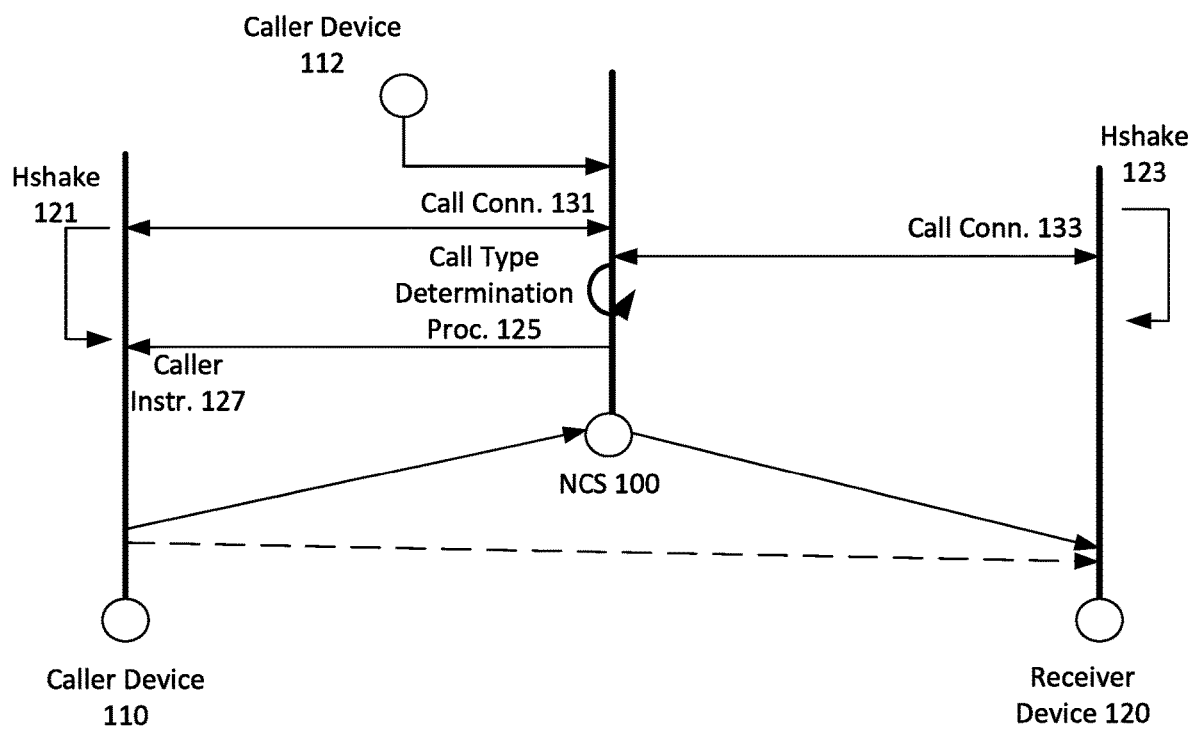
FIG. 1 illustrates a network computer system to dynamically select a voice communication medium for a call connection on a user device.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a network computer system that detects a call connection signal which specifies a phone number of a receiver. The network computer system can communicate with a device of the caller to detect the call connection signal. As an addition or variation, the network computer system can receive an incoming call connection signal for the receiver. The network computer system can use the determined location to make a determination as to whether the call connection is likely to be supported for at least one of the caller or receiver using a first voice communication medium, as compared to an alternative voice communication medium. Based on the determination, the network computer system can cause the call connection to be established using the voice communication medium of the determination.

In some examples, the network computer system detects a first user (caller) of a network service initiating a voice communication connection for a second user (receiver) of the network service. The network computer system makes a determination as to whether the call connection can be supported for each of the caller user and receiver user using a voice-over-Internet-Protocol communication (VOIP) medium. If the determination is made that the call connection (or caller/receiver portions thereof) can be supported for one or both of the caller or receiver user, the network computer system implements operations to establish at least the respective portion of the call connection using VOIP. If the determination is made that the call connection cannot be supported using VOIP for either portion of the call connection, the network computer system causes the respective devices of the caller and/or receiver to use an alternative voice communication medium (e.g., cellular service).

The determination as to whether a call connection is likely to be supported can be based on the current and/or future location of the caller and/or receiver, as well as coverage values for the first voice communication medium over a relevant geographic region. The determination of a future location of the caller and/or receiver can be based on, for example, a predicted route or trajectory of the caller or receiver.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver and/or a vehicle) that provides location-based services for requesters.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

System Overview

FIG. 1 illustrates an example network computer system to dynamically select a voice communication medium for a call connection on a user device. A network computer system 100 such as that shown in FIG. 1 can be implemented in a variety of computing environments, including as part of a network service provided through one or more servers. In some variations, the network computer system 100 is implemented as part of, or in connection with a network service. For example, the network computer system 100 can be implemented in connection with a transport arrangement system that matches transport requests with drivers who provide the requested transport. Still further, some examples provide for the network computer system 100 to be distributed using one or more servers and/or mobile devices.

The network computer system 100 may be implemented on a server, on a combination of servers, and/or on a distributed set of computing devices which communicate over one or more networks, including one or more types of cellular networks. In some examples, the network computing system 100 is implemented using mobile devices of users, including provider devices and requester devices, with the individual mobile devices each executing a corresponding service application that causes the respective mobile device to operate as an information inlet and/or outlet for the network computing system 100.

FIG. 1 illustrates a network computer system to select a voice communication medium for a call connection on a user device. In more detail, an example network computer system 100 selects a voice communication medium for call connection requests generated by and/or for users of a network service. As further described by various examples, the determination of the voice communication medium may be made in accordance with rules or other logic that specify a priority, preference or ranking for a particular type of voice communication medium over one or more other types of voice communication mediums.

According to some examples, the system 100 communicates with each of a caller device 110 and a receiver device 120, to enable or facilitate the establishment of a call connection between the respective caller and receiver devices 110, 120. By way of example, each of the caller device 110 and receiver device 120 can include an application program interface to receive instructions from the system 100. As described with other examples, each of the caller and receiver device 110, 120 can operate a respective service application that provides a programmatic interface for enabling the respective device to communicate with and receive instructions from the system 100.

In some examples, the caller device 110 generates a call connection request 131 that specifies the receiver device 120. For example, the caller device 110 can generate the call connection request 131 based on a user input provided through the service application running on that device. The system 100 may respond to the call connection request 131 by implementing a call-type determination process 125 to determine the voice communication medium on which the call connection is to be established. The call-type determination process 125 can be based on a rule set or other logic that specifies a priority, preference or ranking for a particular type of voice communication medium over another.

In examples, the caller device 110 initiates a handshake process 121 with the system 100 when the call connection request 131 is made. The system 100 can identify the receiver device 120 and initiate a handshake process 123 with the receiver device. In examples, the call-type determination process 125 can be initiated and performed during the respective handshake processes 121, 123.

In performing the call-type determination process 125, the system 100 can make a determination as to a likelihood that one or more of the available voice communication mediums will support the call connection. Thus, for example, the system 100 can make a determination as to whether the highest ranked voice communication medium is likely to support the initial establishment of the call connection, as well as sustain the call connection for a given duration (e.g., threshold duration, likely duration of call connection). In making such determinations, the highest ranked voice communication medium may coincide with the voice communication medium that is preferred, based on cost for the respective user, data transfer bandwidth and/or telephony features (e.g., video calling). The highest ranked voice communication medium can utilize, for example, a voice over Internet protocol (VoIP) service that is hosted, or otherwise made available through the system 100. As an addition or variation, the highest rank voice communication medium (e.g., VOIP service provided through the system 100) can provide the lowest cost to the user(s).

Still further, in some examples, the system 100 can provide additional functionality in connection with providing the VoIP communication service. For example, the system 100 can establish the call connection with the receiver device 120 while concealing the phone number of the caller device 110. Additionally, the system 100 can establish the call connection for each of the caller and receiver devices 110, 120 through the respective service application, with the initiation of the voice communication being accompanied by information selected by the system 100. For example, the system 100 may establish the call connection while displaying content on the receiver device 120 that is specific to a service request of the corresponding user.

In some examples, the system 100 performs the call-type determination process 125 to select one of two possible communication mediums from which a newly detected call connection can be established. In other variations, the system 100 implements the call-type determination process 125 to determine one of three or more voice communication mediums which the caller device 110 should utilize to make the call connection. By way of example, the system 100 can perform the call-type determination process 125 to determine if the highest ranked (or most preferred) voice communication medium is suitable for the incoming call connection request 131. If the determination is that the highest ranked voice communication medium is not suitable, then the outcome of the call-type determination process 125 may be to identify the default alternative communication medium. In examples in which three or more voice communication mediums are available, the call-type determination process 125 can determine suitability of the next highest ranked communication medium, until one of the possible voice communication mediums is identified.

According to some examples, the system 100 can perform the call-type determination process 125 using (i) location information for the caller device 110 and the receiver device 120, and (ii) a reference that maps the availability of one or more voice communication mediums to a specific location that is within a given vicinity of the caller device 110 and/or the receiver device 120. As an example, the system 100 can obtain a recent or current location of the caller device 110 or the receiver device 120. In variations, the system 100 can obtain a location profile for the caller and/or receiver device.

In some examples, the call-type determination process 125 includes a predictive determination that identifies likely locations of the caller device 110 and/or the receiver device 120 at a future time interval during which the call connection is expected to be active. For a given caller or receiver, the system 100 determines the likely future locations to be possible future locations of the respective caller and/or receiver which satisfy a threshold probability determination of coinciding with an actual location of the respective caller and/or receiver while the call connection is in progress. The determinations of the likely future locations for the caller and/or receiver can be based on, for example, the current or recent location(s) of the caller device 110 and the receiver device 120, location history and/or other profile information associated with the caller device 110 and/or receiver device 120, and contextual information related to the caller device 110 and/or receiver device 120. By way of example, the system 100 can obtain contextual information that identifies a route or trajectory of the caller, in context of the user of the caller device 110 operating a vehicle when the call signal is initiated.

In an example, the system 100 detects the call connection request 131 from the caller device 110. In response, the system 100 exchanges communications with the caller and receiver devices 110, 120 to obtain location information, profile information and/or contextual information for each of the respective devices. The system 100 then performs the call-type determination process 125 to select the voice communication medium for use in establishing the call connection between the caller device 110 and the receiver device 120. If the system 100 determines that, for example, the VOIP communication service is suitable for the call connection request 131, the system 100 can send a caller instruction 127 to the caller device 110 to cause the caller device 110 to use (or to continue to use) the VOIP communication service. If the system 100 hosts or provides the VOIP communication service, the system 100 can initiate a set of communications 133 with the receiver device 120 to cause the call connection to be established and maintained.

If, on the other hand, the system 100 determines that the highest ranked voice communication medium (e.g., VOIP communication service) is not suitable for the call connection request 131, the system 100 can send the caller instruction 127 to cause the caller device 110 to use an alternative communication medium. For example, the system 100 can instruct the caller device 110 to use a default telephony service, or another third-party telephony service (e.g., using a corresponding application) on the caller device 110 to make the call connection. As a result, the caller device 110 may place the call connection using, for example, cellular voice/telephony services, rather than through a data channel connection for a VOIP communication service.

According to some examples, the system 100 performs the call-type determination process 125 by determining the suitability for one or more of the possible voice communication mediums for each of the caller and receiver devices 110, 120. The determination of suitability can be based on, for example, a probabilistic determination (or one or more indicators thereof) that a call connection by the respective caller and receiver devices 110, 120 can be established and sustained for a threshold duration (e.g., likely duration of the call connection). In some examples, the system 100 selects a high-ranking voice communication medium (e.g., VOIP communication medium) if the selected voice communication medium is deemed to be suitable for both devices.

In variations, the system 100 separately determines the suitability for the high-ranking voice communication medium for each of the caller and receiver devices 110, 120. In such examples, the system 100 can separately support the high-ranking voice communication medium for one or both of the respective caller and receiver devices, based on the determination of suitability for each of the respective devices. In such variations, the system 100 can provide a relay that interconnects the call connection using multiple voice communication mediums. For example, the call connection may be initiated on the caller device 110 using a VOIP communication service, and the system 100 relays the call connection to another service (e.g., cellular voice service) to complete the call connection with the receiver device 120.

As an addition or variation, the system 100 can be configured to make a portion of the call connection when only one of the caller or receiver device 110, 120 includes a programmatic interface (e.g., service application) to receive commands and control information from the system 100. In some examples, the system 100 may receive call connections for a phone number that is associated with the receiver device. When the incoming call connection 131 from the caller device 112 is received through, for example, an alternative communication medium, the system 100 can make the determination as to whether the high-ranking voice communication medium can support a portion of the call connection between the system 100 and the receiver device 120.

Likewise, in variations, the system 100 can be configured to receive the call connection signal from the caller device 110, specifying a phone number for a receiver device which is not associated with a device that the system 100 shares a programmatic interface with. In such variations, the system 100 can make the determination as to whether the high-ranking voice communication medium can support the portion of the call connection between the system 100 and the caller device 110.

Figure 2:
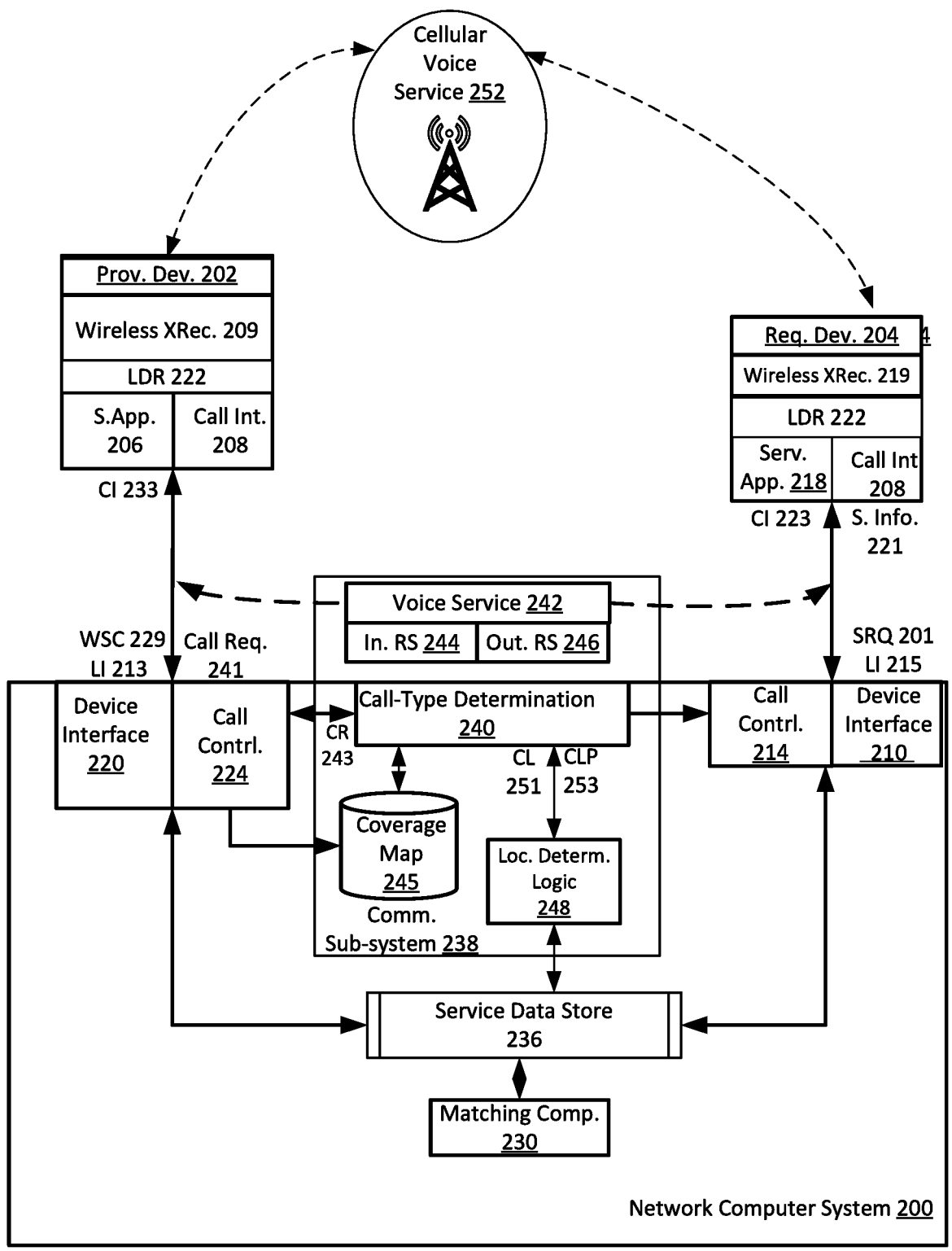
FIG. 2 illustrates an example of a service arrangement system that facilitates call connections amongst users in context of users providing or receiving services.

FIG. 2 illustrates an example of a service arrangement system that facilitates call connections amongst users in context of users providing or receiving services. According to examples, a service arrangement system 200 may be implemented as a network service, using, for example, a network computer system 100 such as described in FIG. 1. In some examples, the system 200 implements a network platform in connection with applications that run on mobile devices of the population of users. In variations, the types of services which may be arranged through the system 200 may include human transport, deliveries, shipping, and other on-demand services. For a given geographic region, the users can include operators (or "service providers") of service vehicles, as well as requesters who receive a transport-related service.

According to examples, the system 200 includes a provider device interface 210, a requester device interface 220, a matching component, a service data store 236, and a communication sub-system 238. The provider device interface 210 includes or performs processes that run on the network-side of the system 200 to establish communication channels as between system 200 and individual devices of service providers. For example, the provider device interface 210 can establish secure sockets with different types of mobile devices. The service providers of the system 200 can utilize these secure sockets when providing services using their respective vehicles.

In some examples, the service providers operate mobile devices (represented in FIG. 2 by the provider device 202) on which a corresponding service application 206 can be executed. The service application 206 may correspond to a program (e.g., a set of instructions or code) that is downloaded and stored on the provider device 202. When installed, the service application 206 can interface with local resources of the provider device 202, including hardware resources such as location determination resources 222 (e.g., satellite receiver for position determination) and software resources (e.g., software libraries, data stores, application programming interface to other services, native and third-party applications). The service provider can launch the service application 206 on the provider device 202 in order to utilize the system 200 to receive service requests, and the service provider may operate a service vehicle to fulfill assigned service requests. Among other functionality, the service application 206 can automate operations which include sending location data 213 (e.g., the current location) and other service-related information to the system 200. The service application 206 may also receive information from the system 200 (e.g., matched service, request, current location of requester, navigation instructions to pickup location or destination, etc.) that facilitates providing the services to requesters.

Likewise, the requester device interface 220 includes or performs processes that run on the network-side of system 200 to establish communication channels with individual devices of requesters. The requesters may also operate mobile devices (represented in FIG. 2 by the requester device 204) on which a corresponding service application 218 runs. The service application 218 may correspond to a program (e.g., a set of instructions or code) that is downloaded and stored on the requester device 204. When installed, the service application 218 can interface with local resources of the requester device 204, including hardware resources such as location determination resources 222 (e.g., satellite receiver for position determination) and software resources (e.g., software libraries, data stores, application programming interface to other services, native and third-party applications). A requester can launch the service application 218 on the requester device 204 in order to utilize the system 200. The requesters may operate respective service applications 218 to request transport-related services, such as human transport between a starting location (or pickup location) and a destination location (or drop-off). Among other functionality, the service application 218 can automate operations which include sending and receiving information with system 200 to further an ability of the requester to make service requests and to receive service. In examples, the requester can operate the requester device 204 to send a service request 201 that includes location information 215, where the location information 215 specifies a current location and/or pickup location for a service request. To arrange the transport service, the system 200 sends the requester information such as an identifier of the matched service provider, as well as the current location of the matched service provider and/or service request.

In some examples, the provider device interface 210 and the requester device interface 220 can each include or use an application programming interface (API), such as an externally provider-facing API, to communicate data with the provider device 202 and requester devices 204, respectively. By providing the externally facing API, the system 200 can establish secure communication channels via secure access channels over the network through any number of methods, such as web-based forms, programmatic access via RESTful APIs, Simple Object Access Protocol (SOAP), remote procedure call (RPC), scripting access, etc.

The requester device interface 220 can operate to exchange communications with the requester device 204. For example, the requester device interface 220 may receive a service request 201 from requester device 204, as well as the location information 215 that relates to the service request 201. The location information 215 can include location information, such as determined by location-aware resources (e.g., satellite receiver). When the requester generates a service request 201, the system 200 can implement processes to match that service request to a service provider. Accordingly, system 200 can communicate service information 221 to the requester device, where the service information can identify information about or relating to a state of the service request 201, such as an open state (e.g., unmatched to service provider), on-route state (e.g., service provider is on-route to service location), in progress state (e.g., requester is on-trip), and completed state (e.g., requester has reached trip completion).

Additionally, in some examples, the provider device 202 and/or requester device 204 can execute the respective service application 206, 218 to acquire wireless signal characteristics 229. Each of the respective service applications 206, 218 can include logic to interface with the wireless transceiver 209, 219 on the respective devices 202, 204, in order to obtain wireless signal characteristics 229. The wireless signal characteristics 229 can measure, for example, characteristics of wireless communications for one or more wireless networks that are utilized by the respective provider and/or requester device 202, 204. The wireless signal characteristics 229 can reflect, for example, measurements of overall throughput, signal strength and/or signal quality for different types of wireless networks. As an addition or variation, the wireless signal characteristics 229 can reflect a measurement of the quality, bandwidth and/or throughput between the respective devices 202, 204 and the system 200. In such examples, the provider and/or requester device 202, 204 can generate tuples or data pairings, that combine the determinations of the wireless signal characteristics 229 with location data (e.g., latitude and longitudinal coordinates) where the respective device made such measurements. The provider and/or requester device 202, 204 can transmit wireless signal characteristics 229, as paired with location data, continuously, repeatedly and/or in response to events.

According to some examples, the provider device 202 initiates communications with the service arrangement system 200 using the service application 206 to indicate that the service provider associated with the provider device 202 is available. The service application 206 may then initiate transmitting the location information 213 for the service provider, along with an identifier of the service provider. When a service provider is available, the service provider can receive assignments (or matched service requests) from the system 200. The service provider can fulfill matched service requests by, for example, driving an associated vehicle to a service start location (e.g., pickup location) to pickup the requester, and then traveling to the destination. The system 200 may maintain information regarding available service providers and/or available provider devices 202. For example, a service state of a service provider can be available or unavailable, or another state which reads on availability (e.g., online, offline, busy, free, on route to starting location, on service route to destination location, etc.).

The provider device interface 220 can record when service providers make themselves available to system 200 to receive assignments (or matched service requests). For example, a service provider can interact with the service application 206 to transition the provider's state to being available or online. In this state, the system 200 can communicate with the provider device 202 to receive location information 213. In some examples, the provider device interface 220 can record the location information 213, along with an identifier of the provider, with a service data store 236. Similarly, the requester device interface 210 can record incoming service requests 201 with the service data store 236.

In examples, the service data store 236 includes data that describes one or more service requests, such as the current location of the requester and/or provider of the active service requests. The service data store 236 may include one or more tangible and/or virtual data storage locations, which may or may not be physically co-located. By way of example, the service data store 236 may include text or alphanumeric data maintained in memory and/or on disk. As another example, the data store can include a database maintained by a database server. In connection with active requests, providers and service requests, the service data store 236 can store service request parameters, service-state information, event information, user information, prior communication information and contextual information relevant for active service requests.

In examples, the service matching component 230 can match open service requests 201 with available service providers, based on location information 213, 215 communicated by the respective provider device 202 and requester device 204. The service matching component 230 can also match the service request 201 and the service provider, based on one or more properties of the service provider and/or the requester, such as, for example, preferences, proximity, type of service, and/or context. Once the service provider is matched to the service request 201, the service matching component 230 can change the service state associated with the selected service provider. For example, a service state of the service provider can be changed from available to unavailable, or from available to on route to the starting location associated with the service request.

After the service matching component 230 matches the service request between the requester device 204 and the provider device 202, the service arrangement system 200 can continue to manage and/or monitors the service arrangement until the service request 201 is completed. For example, the system 200 may perform management and monitoring activities based on service-specific information communicated by the provider device 202 and/or the requester device 204.

The communication sub-system 238 can provide or enable voice-telephony communications between users of system 200. According to examples, the communication sub-system 238 can host, provide or otherwise enable access to a VOIP service 242 for use as between user devices. The communication sub-system 238 can be integrated with system 200, such that functionality used with the system 200 can facilitate voice communications made available through the communication sub-system 238. In variations, the VOIP service 242 can be provided by a third-party, and the communication sub-system 238 can provide or facilitate access to the third-party service.

In examples, the communication sub-system 238 can enable the parties to establish call connections using the VOIP service 242, without either party having to disclose their phone number or other identifier to the other party. For example, the communication sub-system 238 can enable each party to initiate a call connection without specifying a phone number of the receiving party. Rather, when parties are matched together for a service request, the call connection request from a calling party (e.g., provider device 202) can automatically be directed to the other party.

In examples, one of the provider or requester devices 202, 204 can initiate a call connection to system 200. In an example FIG. 2, the provider device 202 sends a call connection request 241 to system 200 via the provider device interface 220. The call connection request 241 can be generated by, for example, the provider interacting with the service application 206 to initiate a call to the requester, while the provider is approaching the requester. For example, the service application 206 can provide a call feature that the provider can select to initiate the call connection to the requester device 204 of the matched service request 201. The call connection request 241 can cause the call-type determination component 240 to select a voice communication medium for the call connection request.

According to examples, the communication sub-system 238 can provide the VOIP service 242 in connection with arranging transport services and providing other services for users. In such examples, a call connection can be initiated by one client device (e.g., provider device 202) for another client device (e.g., requester device 204). By way of example, the provider can use the call connection feature to make a call connection to the receiver device 204. The call connection can facilitate communications between the provider and requester, enabling, for example, the provider to more readily locate the requester, or the requester to better communicate information about the requested service.

According to examples, the calling feature 208 can be used by the caller (e.g., provider) to generate the call connection request 241. For example, when the caller is the provider, the provider device interface 220 can receive the call connection request 241, and further use the service data store 236 to identify the phone number of the matched requester as the receiving party. The provider device interface 220 can, for example, generate a calling record 243 that identifies the caller (e.g., provider device 202), the caller's phone number, the receiver (e.g., receiver device 204), and the receiver's phone number.

In examples, each of the provider and requester devices 202, 204 can use the calling feature 208 to initiate and use the VOIP service 242 via the system 200. The calling feature 208 can be implemented as functionality provided with the service applications 206, 218 running on the respective provider and/or requester devices 202, 204. The system 200 can control the availability and/or functionality of the calling feature 208 by communicating call control information 233, 223 to the respective service application 206, 218. For example, the calling feature 208 can be suppressed, hidden, or disabled based on the call control information 233, 223 received by the corresponding device 202, 204.

With reference to an example of FIG. 2, each of the provider and requester device interfaces 220, 210 can include call control logic 224, 214 to communicate respective call control information 233, 223 to corresponding provider and requester devices 202, 204. The call control information 233, 223 can be communicated to each of the respective devices 202, 204, and further implemented by the corresponding service application 206, 218 to configure the calling feature 208 provided on each of the respective devices. In this way, the calling feature 208 provided on each device 202, 204 can be configured by the system 200, based on, for example, the current location of the respective user.

In examples, the communication sub-system 238 can also use call control logic 224, 214 to configure the behavior and functionality provided with the respective calling feature 208 of the corresponding provider or requester computing device 202, 204. By way of example, the communication sub-system 238 can anonymize call connection features that use the VOIP service 242. In the context of a matched provider and requester, the calling feature 208 provided by the respective service applications 206, 218 on corresponding computing devices 204, 202 may be configured to initiate or receive call connections from the other computing device of the matched service request. For example, the communication sub-system 238 can use control logic 224 to configure the calling feature 208 on the provider device 202 to enable the provider device to initiate a call connection to the requester with selection of one feature (e.g., "call connect" button). Likewise, the communication sub-system 238 can use the control logic 214 to configure the calling feature 208 on the requester device 204 to enable the requester device to initiate a call connection to the provider with selection of the calling feature 208. The communication sub-system 238 can enable the functionality on each of the respective computing devices 202, 204 without the corresponding user having knowledge of, for example, the phone number or user-identifier of the receiving party (e.g., requester). Additionally, in some examples, the communication sub-system 238 can selectively configure the telephony functionality and behavior provided with the service applications 206, 218 on the respective user devices 202, 204. In particular, the telephony functionality and behavior can be based on a variety of conditions, such as a state of the service request 201 (e.g., enable functionality when provider is on-route to a pickup location).

In examples, the communication sub-system 238 can control each of the respective computing devices 202, 204 to trigger, or otherwise enable the respective computing device to use an alternative voice communication service. For example, each of the computing devices 202, 204 can include native telephony functionality that utilizes an alternative protocol and/or network. For example, each of the computing devices 202, 204 can include a corresponding wireless transceiver 209 to enable the respective computing device to utilize a cellular voice data channel or medium, using a corresponding type of cellular network. Thus, multiple voice communication mediums can be available on each computing device, including, for example, the VOIP service 242.

The call-type determination component 240 selects the type of voice communication medium which one or both devices of a requested call connection are to use when a call connection is requested as between the two devices. As described with other examples, the call-type determination component 240 can rank the available voice communication mediums. In an example of FIG. 2, the call-type determination component 240 selects between the VOIP service 242 and a native telephony service of the respective device, such as provided by a cellular voice network on which the respective device operates. The VOIP service 242 may be the higher ranked or preferred voice communication medium, based on considerations such as (i) a cost of the VOIP service 242 to the respective parties of the call connection and/or the system 200; (ii) functionality which the system 200 can enable or otherwise provide with the VOIP service 242 to the parties of the call connection, such as enabling one party to a matched service request to call the other party through selection of a calling feature, without knowledge of the other party's phone number or disclosure of their own phone number; and/or (iii) an ability of system 200 to control the availability and functionality of each of the respective devices with respect to utilizing the VOIP service 242.

By contrast, each of the respective requester and provider device can use an alternative wireless network for making and receiving calls. The alternative wireless network can, for example, correspond to a cellular voice service 252 provided by a carrier of cellular services (e.g., native telephony service), and each of the respective provider and requester devices 202, 204 can use a native or default telephony application to place calls using the cellular voice service 252. Depending on considerations such as device type and geographic region, the use of the available cellular voice service 252 can be more expensive for the calling and/or receiving party. Additionally, the functionality which the system 200 can provide to the provider and requester devices 202, 204 may be limited as compared to functionality which the system 200 can provide for use with the VOIP service 242. For example, the system may be unable to shield the phone number of the receiving party to the calling party, or the phone number of the calling party to the receiving party.

According to examples, the call-type determination component 240 can cause each of the calling and receiving device to use the VOIP service 242 for the call connection. On the caller device (e.g., the provider device 202), the control logic 224 can communicate control information 233 to the service application 206, to establish the caller connection with the VOIP service 242. On the receiver device (e.g., the requester device 204), the control logic 214 can communicate control information 223 to the service application 218, to cause the requester device 204 to establish the receiving connection of the call connection with the VOIP service 242. In examples, the call-type determination component 240 can trigger the respective control logic 224, 214 to form caller and receiver connections using respective service applications 206, 218m based on a determination that the VOIP service 242 can establish and sustain the call connection for each of the parties of the call connection.

In the context of services provided through system 200, examples recognize that one or both parties may be in motion, and further that a determination made of the suitability of the VOIP service 242 that is based on the current location of one or both parties can change based on a future location of that party. For example, the provider can initiate a call connection on the provider device 202 (e.g., by interacting with the calling feature 208 while operating the service application 206) to the requester device 204 when the provider is driving towards a location of the requester. In such examples, the determination of the call-type determination component 240 can be probabilistic, based on factors that include (i) the current or recent location of the caller and receiver (e.g., operating provider device 202 and requester device 204); (ii) a call location profile that identifies likely or possible locations of each of the caller and requester over a given duration that is expected to encompass a duration of the call connection; and/or (iii) a duration of time which may be needed for the call connection, such as the expected duration of the call connection.

In examples, each voice communication medium can be characterized by one or more of types of wireless networks on which a corresponding type of voice communication exchange can be conducted. In FIG. 2, the VOIP service 242 is an example of a voice communication medium that can utilize a high bandwidth cellular data channel, such as provided through use of a high-capacity cellular network. Similarly, the cellular voice service 252 of provider device 202 provides an example of a voice communication medium that can utilize a cellular channel (e.g., voice or data) that can be supported by a lower capacity cellular network. In some variations, the determination(s) of call-type determination component 240 can be a comparison, as between the highest ranked voice communication medium (e.g., the VOIP service 242) and the alternative voice communication medium.

The call-type determination component 240 can rank available voice communication mediums for a given geographic area and/or device type. The rankings can reference the location profile of the caller and/or receiver against, for example, a coverage map 245 of the wireless network(s) that support the respective voice communication medium. The coverage map 245 can associate coverage values for a given voice communication medium to individual locations, where the coverage value indicates an ability of a cellular or other wireless network to support a call connection using the VOIP service 242 at the associated location. By way of example, the coverage values can include metrics that reflect strength of signal, signal quality, and data transfer/throughput rate at a particular location.

In some examples, each of the voice communication mediums available to the provider device 202 (or requester device 204) are provided by a common cellular provider, but the VOIP service 242 (or highest ranked) may be supported by a sub-portion (or sub-network) of the cellular provider's network. By way of example, each voice communication medium may be supported by one or more types of cellular networks, provided using respective cellular technologies, such as CDMA (Code Division Multiple Access) and GSM (Global System for Mobiles) technologies. The cellular technologies can further be characterized by data transfer and bandwidth capabilities, and/or sub-category designations (e.g., generational designations, such as "3G" (or third generation), "4G" (or fourth generation) "5G" (or fifth generation) designations). In a given region, a cellular provider's network can encompass fixed-point transceivers that include technologies with one or multiple designations. In such examples, the cellular voice service 252 can be supported using multiple technologies of the cellular provider, including older and newer technologies (e.g., using 3G, 4G and 5G), while the VOIP service 242 may only be supported for the respective devices using newer technology (e.g., 4G or 5G). The coverage map 245 can reflect signal strength and signal quality metrics for different cellular networks (e.g., GSM and CDMA), as well as different sub-categories or other designations of the cellular networks (e.g., 4G or 5G). In examples, the VOIP service 242 may be deemed suitable when the coverage value for a particular cellular technology (e.g., 4G or 5G) is of a threshold level, with respect to metrics such as strength of signal and signal quality. The determination of suitability may be based on a probability or likelihood that a call connection can be established and sustained using a particular cellular or wireless technology, at a sufficient level of quality for a given duration of time (e.g., threshold time duration).

In examples, the call-type determination component 240 obtains values for the coverage map 245 from one or more third-party sources. As an addition or variation, the call-type determination component 240 can obtain values for the coverage map 245 from computing devices 202, 204. For example, the call-type determination component 240 can configure the service applications 206 to interface with the respective device transceiver 209 and location-determination resource 222, to obtain signal strength and/or signal quality values (or other coverage values) for specific locations (e.g., geographic coordinates). Still further, in variations, the service application 206, 218 can implement signal determination logic and/or access signal determination resources that are local to the respective device, in order to determine signal strength and signal quality values at various locations recorded by the location-determination resource 222 of the device.

In some examples, the call-type determination component 240 can store a priori association of each voice communication medium with coverage values of the cellular network that supports the voice communication medium on the user's device. By way of example, the VOIP service 242 can be supported by one or more types of cellular networks that provide data channels of a threshold capability, where the threshold capability is defined in terms of, for example, minimum metrics representing strength of signal, signal quality, data transfer/throughput rate and/or quality of service. Likewise, the alternative or default voice service 252 can be supported by cellular networks that can support, depending on the type of cellular technology used by the respective device, data or voice channels of a corresponding threshold capability. In such examples, the threshold capability of the cellular networks that support the VOIP service 242 may be greater than those of the wireless networks that support the cellular voice service 252. In some geographic regions, the availability of the cellular network(s) that can support the highest-ranked service may be more sparse, as compared to the cellular(s) networks that can support the default cellular telephony functionality of the respective device. Thus, the coverage values of the coverage map 245 can reflect, directly or indirectly, the sparsity of the cellular network that is suitable to support call connections made over the VOIP service 242.

In examples, the coverage map 245 includes a data structure that pairs geographic locations, such as identified by coordinates of latitude and longitude, with corresponding coverage values. The coverage values can reference, for example, each of the identified locations with one or more measured signal metrics, where the signal metrics reflect the signal strength and/or signal quality of the cellular network(s) that can support each of the available voice communication mediums (e.g., the VOIP service 242 and cellular voice service 252). In some variations, the measured signal metrics can reflect, for example, signal characteristics as between the device at a particular geographic location (e.g., within 3 meters of a geographic coordinate) and a closest fixed point transceiver of a particular wireless network.

In variations, the coverage map 245 can also include coverage values that are specific to the cellular provider or type of cellular technology in use. For example, in a given region, the coverage value of one cellular provider may be more sparse than the coverage value of another cellular provider.

As an addition or variation, the coverage map 245 can be specific to the type of device (e.g., device manufacturer, model, type of operating system). For example, older devices may have less advanced antennas, and thus have lesser coverage values as compared to newer generation devices.

With respect to the examples provided, the coverage map 245 can be built in part using measurements that are repeatedly (e.g., periodically, responsive to events, etc.) obtained from the individual devices using the respective service applications 206, 218.

In some variations, the coverage map 245 can be specific to the particular caller or receiver device. For example, the coverage map 245 can be developed for individual user devices, and used to predict coverage values at different locations over time.

As described by an example, a call connection request 241 can be used to generate the calling record 243, which can include the phone numbers of the respective calling and receiving parties. The call-type determination component 240 can use the information of the calling record 243 to make a determination of the voice communication medium that is to be utilized for the call connection. The determination can correspond to a determination of whether the VOIP service 242 is suitable for each of the calling party and receiving party, based on the current location and the call location profile of each of the parties. Thus, in examples, the call-type determination component 240 can make a separate determination of the suitability of the VOIP service 242 for each party of the call connection request, and further enable use of the VOIP service 242 if both devices are in a location that sufficiently supports each of the respective devices in using a suitable wireless network to sustain the call connection.

In order to make the determination as to whether the VOIP service 242 is suitable, the communication sub-system 238 can include location-determination logic 248 to access the service data store 236 to determine the current location 251 and call location profile 253 of each of the caller and requester. The current location 251 can be determined by referencing the identifier of the caller (e.g., provider device 202) and receiver (e.g., requester device 204) with updated location information 213, 215 provided in the service data store 236. The location-determination logic 248 can determine the call location profile 253 using one or more rule sets and/or models. In one implementation, the call location profile 253 includes a set of locations that are within a threshold range of a reference location (e.g., current location), where each location of the set represents a possible location of one of the calling parties at some point in the future while the call connection is likely in progress. For example, the set of possible locations can include multiple locations distributed in a circle about the current location of the particular calling party. In an implementation, each location of the location profile 253 can be assigned an equal weight, meaning the call-type determination component 240 assumes each location of the location profile 253 to have an equal likelihood of being the location of the respective caller or receiver. The call-type determination component 240 can then make the determination based on the coverage value assigned to each location of the location profile.

In variations, the location-determination logic 248 can weight locations of the call location profile based on information that is known or determinable from the service data store 236, and/or through execution of the service applications. By way of example, one of the calling parties can correspond to the provider, as the provider travels to a service location of the corresponding service request. The location-determination logic 248 can use the service data store 236 to determine a bearing of the provider (e.g., north, south, west, east, etc.), and then use the bearing information to weight the locations of the location profile 253 to reflect higher probabilities for a possible location of the provider during an upcoming call based on the provider's current location and bearing. As an addition or alternative, the location-determination logic 248 can use the service data store 236 to determine a travel velocity, or expected travel velocity of the service provider at one or multiple times in a future interval when the upcoming call is likely to be ongoing. The location-determination logic 248 can use the travel velocity to similarly weight or otherwise select locations within the threshold range for use in the location profile 253, based on observed or expected travel velocity, as determined from the service data store 236. Still further, the location-determination logic 248 can determine a planned route or portion thereof for the provider, based on the state of the service provider (e.g., service provider is on-route to service location) and other information (e.g., information specified by the service request 201). The location-determination logic 248 can then weight or otherwise select locations within the threshold range based on the planned or likely route of the service provider.

In variations, the location-determination logic 248 can weight locations of the call location profile based on contextual information, such as time of day (e.g., service provider is more likely to be on highway when traveling to service location). For the requester as one of the parties of the call connection, the location-determination logic 248 can compare, for example, the current location of the requester to the requested service location. The location-determination logic 248 can further determine whether the requester is walking to the service location, and/or what route the requester may take to arrive at the service location. The planned travel (e.g., walking route) of the requester can be used to weight or select the locations of the caller location profile 253.

In the context of pooling, one requester may be the calling party in the vehicle, traveling to a service location of another requester. The route, bearing, velocity, and current location of the requester in the vehicle can be used to weight or select locations for the caller location profile 253.

The determination of the threshold range can set the size of the caller location profile. The threshold range can reflect a minimum or expected duration of time for the duration of a call connection. In some implementations, the threshold time duration is a constant, selected as being the requisite amount of time to enable the provider and requester to adequately communicate information relating to the service being provided via a telephonic channel. The location-determination logic 248 can select the threshold time duration based on, for example, observed call connection times. The location-determination logic 248 can further refine the call connection times based on additional factors, such as the geographic region, the time of day or day of week, or other contextual information. Still further, the location-determination logic 248 can predict or model the call connection time based on the historical information, identifying prior call connections and durations.

In some examples, the call-type determination component 240 can make a probabilistic determination as to whether the VOIP service 242 can support a call connection. The call-type determination component 240 can, for example, determine an overall score that indicates a probability that the call connection will be maintained. As an addition or variation, the call-type determination component 240 can base the determination on a score that indicates a probability of the call connection failing, or being maintained at a particular location. For example, the call-type determination component 240 can determine against using the VOIP service 242 when the provider is traveling on a route that has a high probability of passing through a location where the call connection made through the VOIP service 242 will likely be dropped. In such an example, the high likelihood that the call connection will be dropped at one probable location of one party can cause the call-type determination component 240 to determine against using the VOIP service 242 for the call connection. In such examples, such a determination may be made even when, for example, the majority of other locations of the call location profile 253 are associated with coverage values that indicate the call connection can be sustained through use of the VOIP service 242.

As described with examples provided, if the VOIP service 242 can be used, the call-type determination component 240 signals the VOIP service 242 to establish a call connection between the provider and requester devices 202, 204, using the calling record 243. The call control logic 224 can then signal call control information 233 to the provider device 202 that triggers the establishment of the call connection through the VOIP service 242, using the service application 206 running on the provider device 202.

When the determination of the call-type determination component 240 is against using the VOIP service 242, the call-type determination component 240 trigger the call control logic 224 to signal call control information 233 to the provider device 202 (operating as the caller), causing the provider device to use an alternative voice communication medium. For example, the service application 206 can be configured by the call control information 233 to access a native telephony application of the provider device 202, to establish the call connection using the cellular voice service 252. In such instance, the call control information 233 can include information which the provider device 202 may need to establish the call connection using the cellular voice service 252. For example, the call control information 233 can include the phone number of the receiving device (e.g., requester device 204).

In examples, the alternative voice communication medium (e.g., cellular voice service 252) can be accessed through the service application 206, 218 of the respective device. In some examples, the use of the alternative voice communication service (e.g., cellular voice service 252) can be automated in part. For example, the service application 206, 218 can run on the caller device to automate the dialing of the receiver device. In variations, the alternative voice communication medium can be accessed as an independent process. For example, when the provider device 202 makes the call connection request 241, and the call-type determination component 240 determines against using the VOIP service 242, the service application 206 may trigger the native telephony application of the provider device 202 to launch, and to enable the user to perform steps for forming the call connection (e.g., enter number, and/or submit phone number).

In some examples, the communication sub-system 238 includes an outgoing relay service 244 which can connect a call connection of the caller device, made through the voice service 242, with a cellular voice service for calling the receiver device. In such examples, the call-type determination component 240 can make the determination that the VOIP service 242 is suitable for the caller device, irrespective of the determination made for the receiver device. Still further, the outgoing relay service 244 can enable the caller device to use the voice service 242 to contact another party that may not have access to the service application (e.g., non-user of service provided by system 100). In such examples, the call-type determination component 240 can make the determination that the VOIP service 242 is suitable for the receiver device, independent of the determination made for the caller device. Still further, the communication sub-system 238 can receive call connections on behalf of the receiver device, and connect the receiver device to the call connection using the incoming relay service.

Among other advantages, the outgoing and incoming relay services 244, 246 can be configured to provide functionality that benefits the respective device that uses the VOIP service 242. For example, the outgoing relay service 244 can shield the caller's phone number from the receiver. Likewise, the incoming relay service 246 can shield the receiver's phone number from the caller.

As an addition or variation, the communication sub-system 238 can also include an incoming relay service 246 which can connect a call connection that is received from, for example, a cellular voice service to a receiver device that utilizes the voice service 242.

Figure 3:
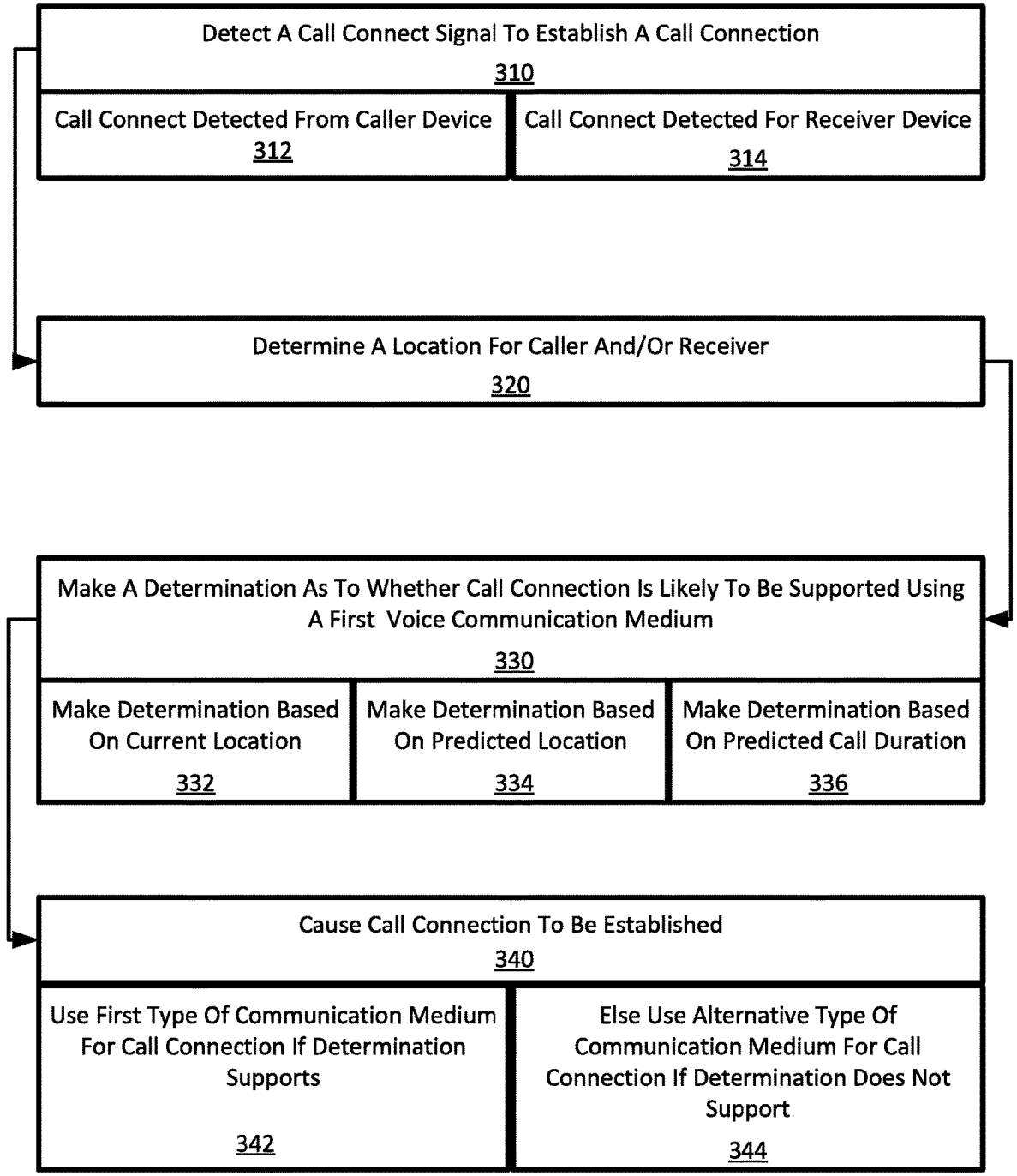
FIG. 3 illustrates a method for selecting a voice communication medium for a call connection on a user device.

FIG. 3 illustrates a method for selecting a voice communication medium for a call connection on a user device. In describing an example of FIG. 3, reference may be made to elements described with FIG. 1, for purpose of illustrating suitable components or elements for performing steps or sub-steps being described.

With further reference to FIG. 3, network computer system 100 detects a call connection signal to establish a call connection (310), where the call connection is to use one or more user devices on which a corresponding telephony resource of the system 100 is provided. As described with examples, the telephony resource may correspond to a service application and/or programmatic interface that enables the user device to access a particular voice service, such as a VOIP service that is hosted or otherwise provided by the system 100.

In some examples, the call connection signal may be in form of a call connection request, communicated from a caller device on which a corresponding service application is provided (312). The call connection request can be for another user device on which the telephony resource of the system 100 is provided. Alternatively, the call connection signal may specify a phone number or other identifier of a device that does not have the telephony resource of the system 100. In other variations, the call connection signal may be from an unknown source, such as from a caller that is not using a device that includes the telephony resource of the system 100. In such examples, the call connection can be detected for the receiver device, and not from the caller device (314).

In response to the call connection signal, the system 100 determines a location for the caller and/or receiver computing devices of the call connection signal (320). In examples, the system 100 can retrieve a current location for the caller and/or receiver computing devices using, for example, a service application of the telephony resource. In variations, the system 100 can track the caller and/or receiver device using a service application, as described with other examples, in advance of the call connection signal being detected.

The system 100 makes a determination as to whether a call connection is likely to be supported using a highest ranked or preferred voice communication medium (330). By way of example, the preferred voice communication medium can include a voice service, hosted or otherwise provided by the system 100, and made available through the telephony resource of the network computer system that is local to the respective caller and/or receiver device. In examples, the computer system 100 makes the determination based on the current location (332) and a predicted location (or set of locations) of the caller and/or receiver device (334). As described by examples, the caller and/or receiver device can be mobile (e.g., caller is in a vehicle), and the coverage value for the network that can support the voice service provided by the system 100 can fluctuate over a given area, based on factors such as the sparsity (or conversely, prevalence) of fixed-point transceivers that support a cellular data service that is used by the respective caller or receiver device to access the voice service provided by the system 100. Accordingly, in some examples, the predicted location(s) of the caller and/or receiver device can be a probabilistic determination, based on, for example, a bearing or velocity of the caller and/or receiver, and/or contextual information (e.g., route or trajectory of the caller and/or receiver device).

In variations, the system 100 can also make the determination based on a predicted call duration (336). The predicted call duration can, for example, determine a range of possible locations for the caller and/or receiver device. In examples, the possible locations of the caller and/or receiver can be weighted, to reflect a probability that the caller and/or receiver device will be at that location at some point during the expected duration of the call.

The system 100 may then direct the caller and/or receiver device to make the call connection using the determined voice communication medium (340). The system 100 may direct the respective caller or receiver device using the programmatic telephony resource. In examples, the system 100 can direct the caller and/or receiver device through the programmatic telephony interface (e.g., service application). According to some examples, the system 100 makes the determination for a call connection that is to be established between caller and receiver devices which each include a respective programmatic telephony interface (e.g., service application) of system 100. In such examples, if the determination is that the call connection can be supported by both caller and receiver device using the voice service provided by the system 100, then the system 100 directs each of the respective computing devices to establish the call connection using the provided voice service (342). If, on the other hand, the determination is that the call connection cannot be supported by either the caller or receiver device using the voice service provided by the system 100, then the system 100 directs each of the respective computing devices to establish the call connection using an alternative (e.g., default voice communication medium) (344). In such case, the system 100 can instruct the caller device through, for example, the programmatic telephony resource (e.g., service application) of the caller device, to access and use the alternative default voice communication medium (e.g., using the native phone application of the caller device).

In other variations, the system 100 can utilize relay services to connect a portion of the call connection using the high-ranking voice communication medium. In such examples, the system 100 can make the determination of whether the provided voice service is suitable for each party of the call connection independently of the same determination for the other party of the call connection.

Hardware Overview

Figure 4:
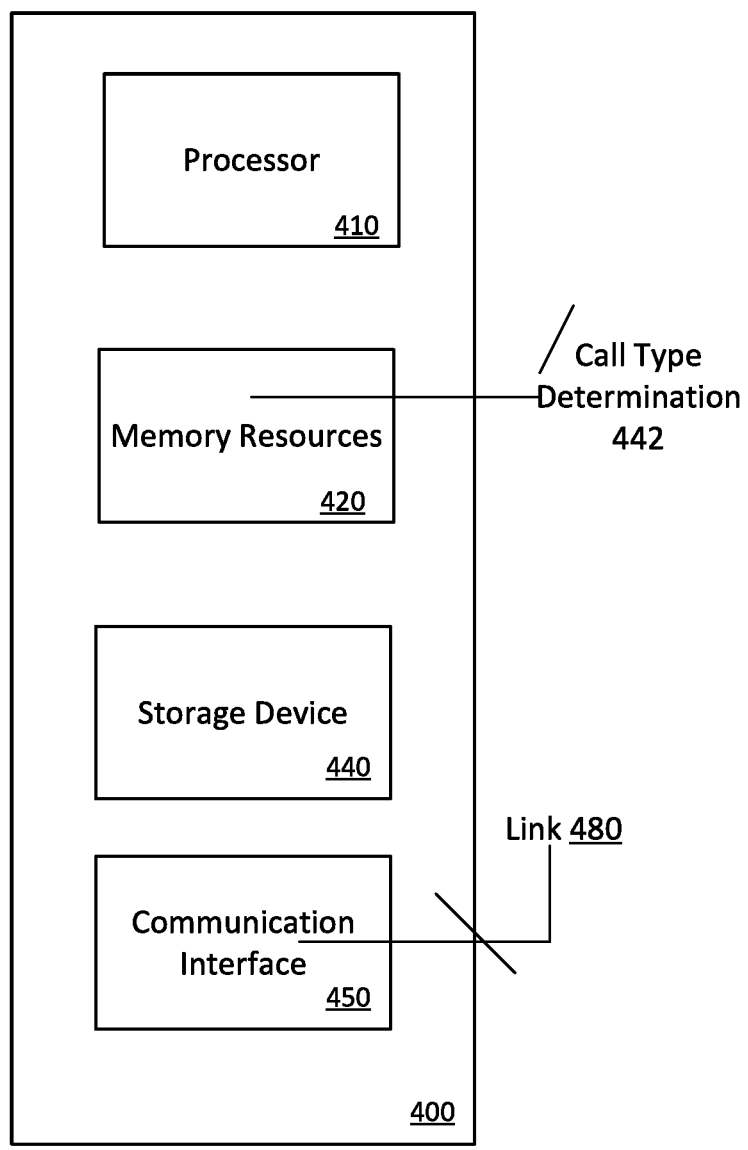
FIG. 4 illustrates a block diagram that illustrates a computer system on which examples described herein may be implemented.

FIG. 4 illustrates a block diagram that illustrates a computer system on which examples described herein may be implemented. For example, in the context of FIG. 1 and FIG. 2, network computer system 100 and/or service arrangement system 200 may be implemented using a computer system or combination of computer systems, such as described by FIG. 4.

In one implementation, the computer system 400 includes one or more processors 410, memory resources 420, and a communication interface 630. The computer system 400 includes at least one processor 410 for processing information. The memory resources 420 may include a random access memory (RAM) or other dynamic storage device, for storing information and instructions to be executed by the processor(s) 410. The memory resources 420 also may be used for storing temporary variables or other intermediate information during execution of instructions to be executed by the processor(s) 410. The computer system 400 may also include other forms of memory resources, such as static storage devices for storing static information and instructions for the processor 410. The memory resources 420 can store information and instructions, including instructions 442 for generating synthetic messages based on service-specific information in order to implement, for example, the service arrangement system 200. Additionally, the processor(S) 410 can execute the instructions 442 to implement a method such as described with FIG. 3.

The communication interface 430 can enable the computer system 400 to communicate with one or more networks 480 (e.g., cellular network) through use of the network link (wireless or wireline). Using the network link, the computer system 400 can communicate with one or more other computing devices and/or one or more other servers or data centers. In some variations, the computer system 400 can receive device data and/or service-specific information from provider devices (e.g., provider device 202) and requester devices (e.g., requester device 204) via the network 480 to facilitate generating synthetic messages based on service-specific information in order to implement and other aspects described herein.

Examples described herein are related to the use of the computer system 600 for implementing the techniques described herein. According to one embodiment, those techniques are performed by the computer system 400 in response to the processor 410 executing one or more sequences of one or more instructions contained in the memory resource 420. Such instructions may be read into the memory resources 420 from another machine-readable medium, such as the storage device. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
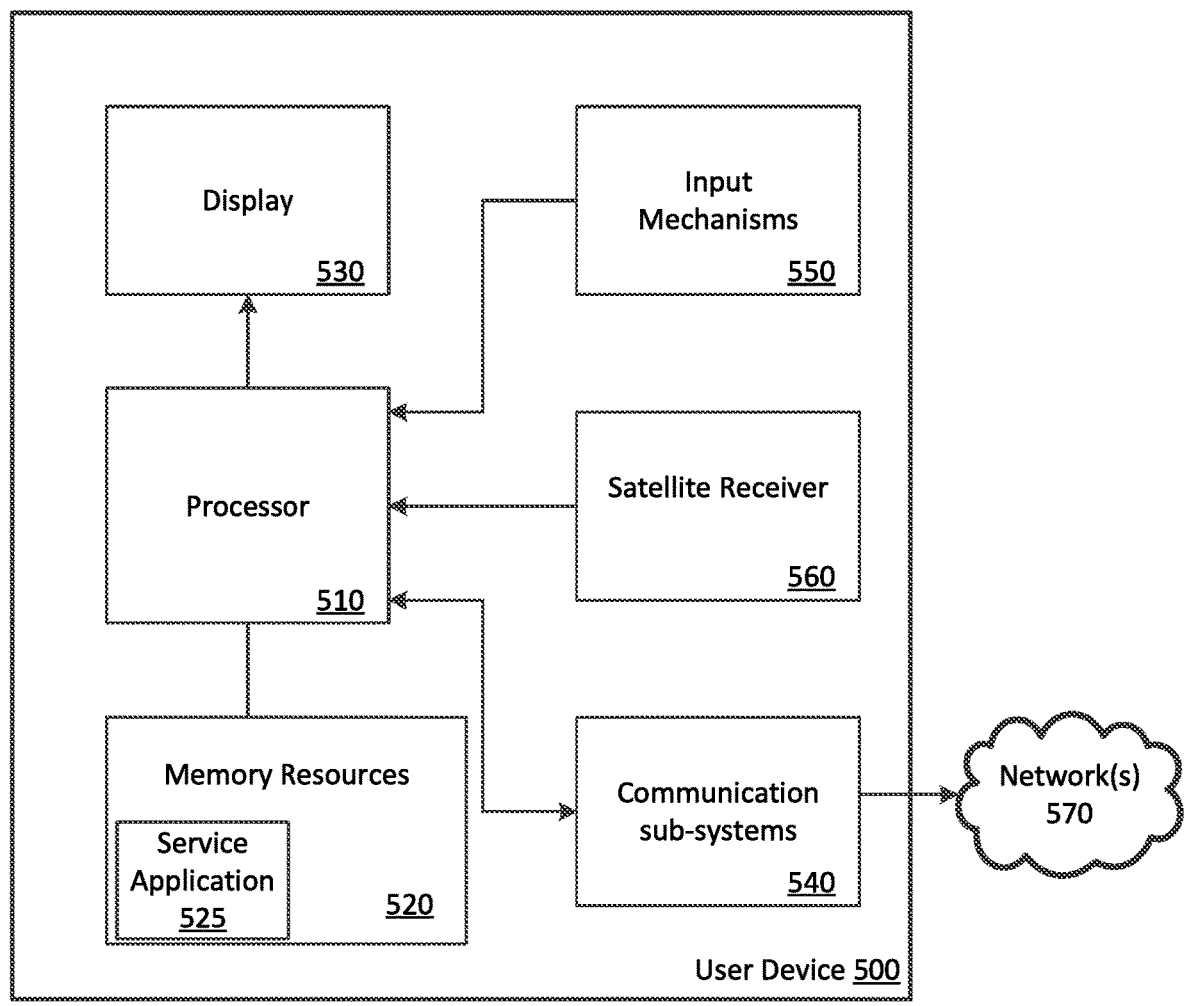
FIG. 5 is a block diagram that illustrates a computing device upon which examples described herein may be implemented.

FIG. 5 is a block diagram that illustrates a computing device upon which examples described herein may be implemented. In one embodiment, a computing device 500 may correspond to a mobile computing device, such as a cellular device that is capable of telephony, messaging, and data services. The computing device 500 can correspond to a device operated by a requester (e.g., provider device 202 and/or requester device 204), or, in some examples, a device operated by the service provider that provides location-based services (e.g., provider device 202 and/or requester device 204). Examples of such devices include smartphones, handsets, tablet devices, or in-vehicle computing devices that communicate with cellular carriers.

The computing device 500 includes a processor 510, memory resources 520, a display device 530 (e.g., such as a touch-sensitive display device), one or more communication sub-systems 540 (including wireless communication sub-systems 540), one or more sensors 550 (e.g., accelerometer, gyroscope, barometer, altimeter, microphone, camera), and one or more location detection mechanisms (e.g., GPS component) 560. In one example, at least one of the communication sub-systems 540 sends and receives cellular data over data channels and voice channels. The communications sub-systems 540 can include a cellular transceiver and one or more short-range wireless transceivers. The processor 510 can exchange data with a service arrangement system (not illustrated in FIG. 5) via the communications sub-systems 540.

The processor 510 can provide a variety of content to the display 530 by executing instructions stored in the memory resources 520. The memory resources 520 can store instructions for the service application 525. For example, the processor 510 is configured with software and/or other logic to perform one or more processes, steps, and other functions described with mobile computing devices of occupants of vehicles. In particular, the processor 510 can execute instructions and data stored in the memory resources 520 in order to execute a service application, such as described with various examples. In one example, the processor 510 may execute instructions 522 to communicate messages, notifications, service-specific information, and other data between the computing device 500 and the service arrangement system 200.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
a memory component to store a set of instructions;
one or more processors to access the set of instructions to:
enable a caller device to initiate a call connection to a receiver device without the caller device specifying a phone number for the receiver device;
detect, from the caller device, a call connection signal to establish the call connection between the caller device and the receiver device;
determine a location of at least one of the caller device or the receiver device;
make a determination as to whether the call connection is likely to be supported using a first voice communication medium as compared to one or more alternative types of voice communication mediums, the determination being based at least in part on a predictive determination that identifies likely locations of the caller device and/or the receiver device at a future time interval during which the call connection is expected to be active;
in response to making the determination that the call connection is likely to be supported using the first voice communication medium, cause the call connection to be established using the first voice communication medium; and
in response to making the determination that the call connection is not likely to be supported using the first voice communication medium, provide call control information to the caller device to cause the caller device to use the one or more alternative types of voice communication mediums to initiate the call connection, wherein the call control information specifies the phone number of the receiver device.

2. The computer system of claim 1, wherein the first voice communication medium is supported by a first type of wireless network that is deployed in a geographic region of at least one of the caller device or the receiver device, and wherein the one or more processors make the determination by determining a coverage value of the first type of wireless network over a sub-region that includes the determined location of at least one of the caller device or the receiver device.

3. The computer system of claim 2, wherein the first voice communication medium utilizes a first type of cellular network, and wherein the one or more alternative types of voice communication mediums use an alternative type of cellular network.

4. The computer system of claim 3, wherein the first voice communication medium utilizes a first type of voice communication protocol, and wherein the one or more alternative types of communication mediums utilize a corresponding alternative communication protocol.

5. The computer system of claim 1, wherein the one or more processors determine the likely locations of the caller device and/or the receiver device by predicting a duration of the call connection using profile information associated with one of the caller device or the receiver device.

6. The computer system of claim 1, wherein the one or more processors detect the call connection signal on a network computer, in connection with a network service provided for at least one of a user of the caller device or a user of the receiver device.

7. The computer system of claim 6, wherein the one or more processors detect the call connection signal as generated through a service application that executes on the caller device, to utilize the network service separate from a native phone application that also executes on the call device.

8. The computer system of claim 7, wherein in response to the one or more processors making the determination that the call connection is likely to be supported using the first voice communication medium, the one or more processors access the set of instructions to establish the call connection using a respective service application executing on each of the caller device and the receiver device.

9. The computer system of claim 1, wherein the first voice communication medium utilizes a voice-over-Internet-Protocol (VOIP).

10. The computer system of claim 1, wherein the first voice communication medium is, as compared to the one or more alternative type of communication mediums, characterized by at least one of a lower cost, a better quality of call connection, a higher data transfer rate, or a greater number of calling features.

11. The computer system of claim 1, wherein the one or more processors make the determination that the call connection is likely to be supported using the first voice communication medium by determining a probability of the call connection being sustained for a given duration.

12. The computer system of claim 11, wherein the one or more processors determine the probability of the call connection being sustained by determining a probability of a location of the receiver device during the given duration.

13. The computer system of claim 1, wherein the one or more processors cause the call connection to be established during a handshake process that is initiated after the call connection signal is detected.

14. The computer system of claim 1, wherein the one or more processors access the set of instructions to:
in response to making based on the determination that the call connection is likely to be supported using the first voice communication medium, establish the call connection between the caller device and the receiver device using the first voice communication medium without providing the caller device with the phone number for the receiver device.

15. The computer system of claim 14, wherein the caller device includes a service application that communications with the computer system to establish the call connection, the service application being different than a telephony application which of each of the caller device; and wherein in response to making the determination that the call connection is not likely be supported using the first voice communication medium, the one or more processors to provide the call control information to the caller device to cause the telephony application of the caller device to initiate the call connection.

16. The computer system of claim 15, wherein the call control information causes the telephony application of the caller device to use an alternative default communication medium to initiate the call connection.

17. The computer system of claim 1, wherein the one or more processors determine the likely locations of the caller device and/or the receiver device based on a planned route or trajectory associated with the caller device or the receiver device.

18. The computer system of claim 17, wherein the planned route or trajectory is determined from service request data for a service request being fulfilled by a user of the caller device or the receiver device.

19. A non-transitory computer readable medium storing instructions that, when executed by one or more processors of a network computer system, cause the one or more processors to:
enable a caller device to initiate a call connection to a receiver device without the caller device specifying a phone number for the receiver device;
detect, from the caller device, a call connection signal to establish the call connection between the caller device and the receiver device;
determine a location of at least one of the caller device or the receiver device;
make a determination as to whether the call connection is likely to be supported using a first voice communication medium as compared to one or more alternative types of voice communication mediums, the determination being based at least in part on a predictive determination that identifies likely locations of the caller device and/or the receiver device at a future time interval during which the call connection is expected to be active;
in response to making the determination that the call connection is likely to be supported using the first voice communication medium, cause the call connection to be established using the first voice communication medium; and
in response to making the determination that the call connection is not likely to be supported using the first voice communication medium, provide call control information to the caller device to cause the caller device to use the one or more alternative types of voice communication mediums to initiate the call connection, wherein the call control information specifies the phone number of the receiver device.

20. A computer-implemented method of servicing ride requests, the method being performed by one or more processors of a network computer system and comprising:
enabling a caller device to initiate a call connection to a receiver device without the caller device specifying a phone number for the receiver device;
detecting, from the caller device, a call connection signal to establish the call connection between the caller device and the receiver device;
determining a location of at least one of the caller device or the receiver device;
making a determination as to whether the call connection is likely to be supported using a first voice communication medium as compared to one or more alternative types of voice communication mediums, the determination being based at least in part on a predictive determination that identifies likely locations of the caller device and/or the receiver device at a future time interval during which the call connection is expected to be active;

in response to making the determination that the call connection is likely to be supported using the first voice communication medium, causing the call connection to be established using the first voice communication medium; and in response to making the determination that the call connection is not likely to be supported using the first voice communication medium, providing call control information to the caller device to cause the caller device to use the one or more alternative types of voice communication mediums to initiate the call connection, wherein the call control information specifies the phone number of the receiver device.

* * * * *